Nov. 21, 1950 P. J. WHIPPLE 2,530,747
FLUME GATE FOR CRANBERRY BOGS AND THE LIKE
Filed June 21, 1947 2 Sheets-Sheet 1
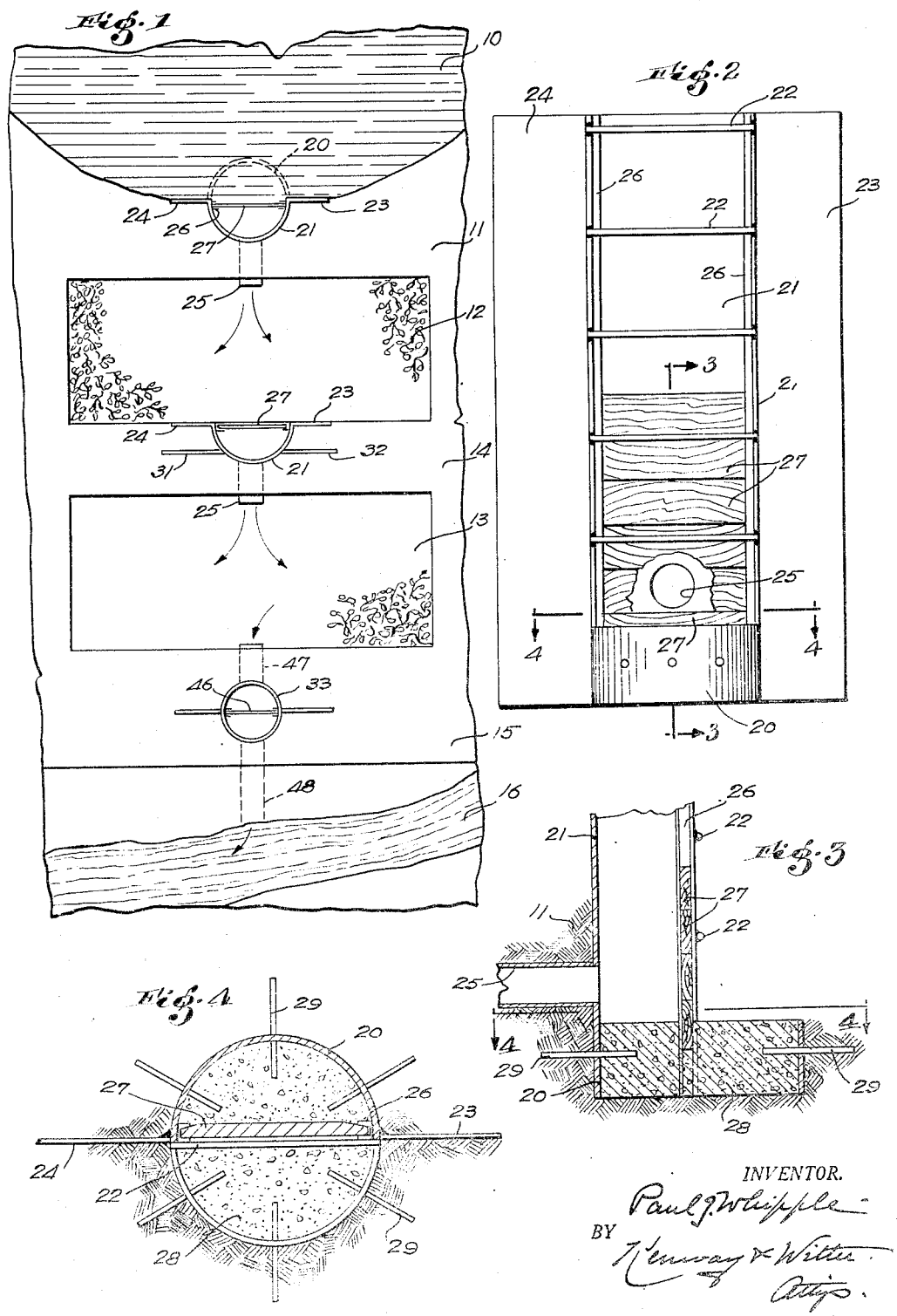
INVENTOR.
Paul J. Whipple
BY Kenway & Witter
Attys.

Nov. 21, 1950 P. J. WHIPPLE 2,530,747
FLUME GATE FOR CRANBERRY BOGS AND THE LIKE
Filed June 21, 1947 2 Sheets-Sheet 2
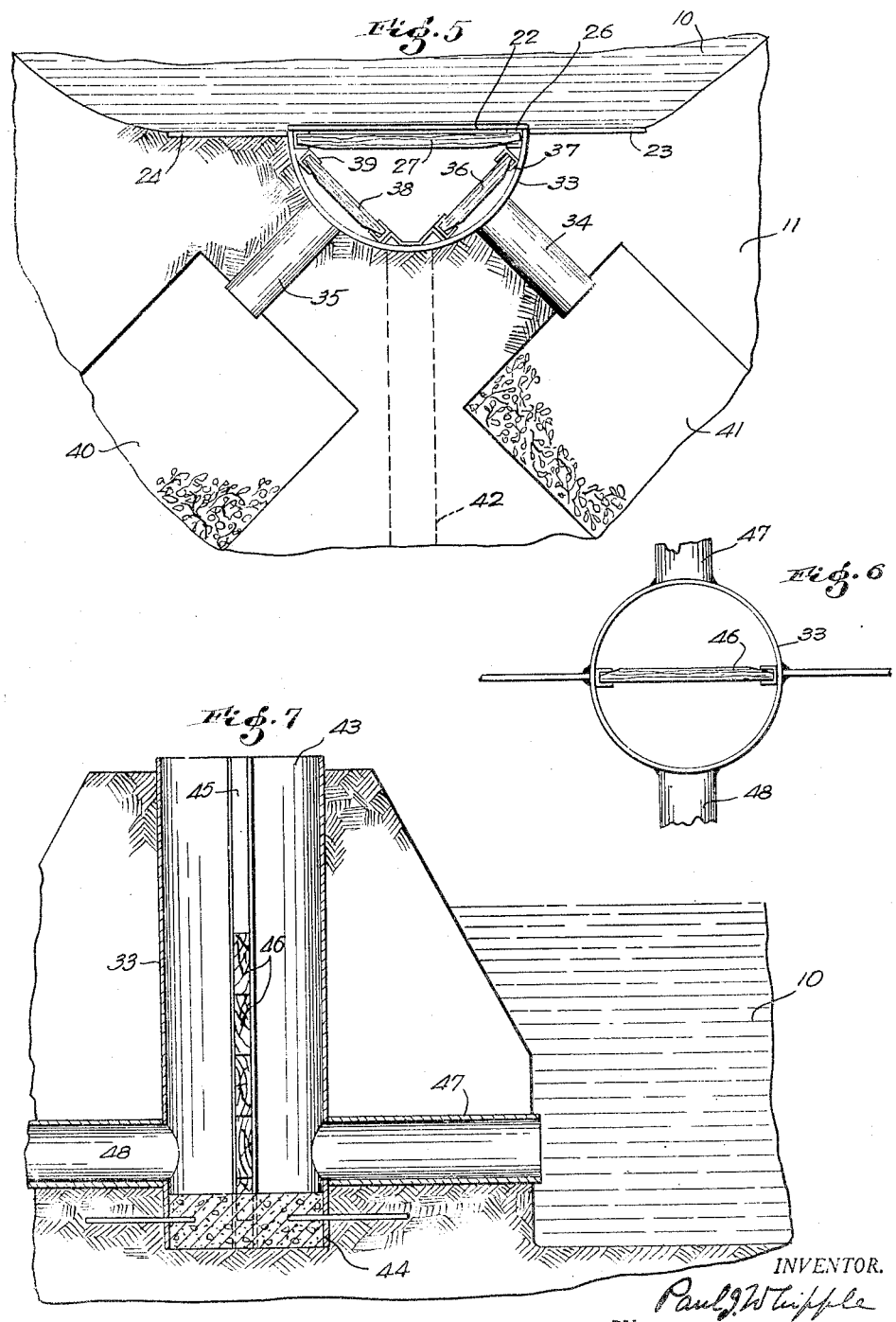
INVENTOR.
Paul J. Whipple
BY Kenway & Witter
Attys.

Patented Nov. 21, 1950

2,530,747

UNITED STATES PATENT OFFICE 2,530,747

FLUME GATE FOR CRANBERRY BOGS AND THE LIKE

Paul J. Whipple, Plymouth, Mass.

Application June 21, 1947, Serial No. 756,245

6 Claims. (Cl. 61—12)

This invention comprises a new and improved flume gate for use in connection with cranberry bogs and the like.

Operators of cranberry bogs are required during the spring and fall seasons to flood their bogs from time to time on very short notice in order to protect the crop from sudden frosts. It is also important to clear or drain the bogs promptly as soon as the danger of frost has passed.

The flume gate of my invention is designed to control these flooding and draining operations, and the object of the invention is to make available a complete self-contained flume gate construction which may be handled as a unit and conveniently installed at any selected point in the dike which defines the bog or the reservoir containing the water supply.

In its preferred construction the flume gate of my invention comprises a circular base and a semi-circular body portion provided in its flat side with guide-ways for spill-boards that may face the reservoir, and in its cylindrical side with discharge passages or ports which may be led at any desired angle to the adjacent bog or bogs. This construction has the advantage of requiring a minimum amount of material and of disposing the spill-boards where they can be conveniently manipulated at short notice. Preferably the walls at the open or flat side of the flume gate will be tied together to provide a sturdy structure, and guide-ways will be provided for one or more sets of spill-boards within the body of the flume gate to determine different water levels controlled by the respective discharge openings.

As an optional feature it is proposed to provide laterally extending wings upon the exterior of the flume gate to prevent muskrats from burrowing about its periphery and cause serious leakage in the dike.

Another feature of the invention consists in the provision of a circular base portion which not only lends stability to the flume gate as a whole, but serves as a foundation and anchor when filled with cement and provides a water-tight seal with the lower spill-board of the series.

These and other features of the invention will be best understood and appreciated from the following description of preferred embodiments thereof, selected for purposes of illustration and shown in the accompanying drawings in which:

Fig. 1 is a plan conventionally indicating the general relation of reservoir, bogs, flume and flume gate in a typical installation, Fig. 2 is a view of the flume gate in elevation showing portions of the spill-boards broken away, Fig. 3 is a view in longitudinal section on a smaller scale on the line 3—3 of Fig. 2, Fig. 4 is a view in cross-section on the line 4—4 of Fig. 2, Fig. 5 is a view of a double outlet flume gate as seen from above, Fig. 6 is a view of a circular flume gate as seen from above, and Fig. 7 is a view of a circular flume gate shown as installed in a dike.

The general topography of a cranberry bog area is shown in the plan of Fig. 1 in which the reservoir 10 for the water supply is bounded in part by a dike 11 which separates the reservoir from a cranberry bog 12. This, in turn, is separated from a second cranberry bog 13 by a dike 14, and the second cranberry bog is shown as defined in part by a dike 15 which separates it from a brook 16 to which waste water is discharged when the bog 13 is drained. In its preferred embodiment, the flume gate of my invention comprises a circular cylindrical base 20 from which rises an integral semi-circular body 21. The walls of the semi-circular body portion are tied together and braced by a series of cross bars 22 which are herein shown as welded to the opposite edges of the wall in uniformly spaced relation. Flat transversely extending wings 23 and 24 are formed integrally with the body portion 21 or otherwise attached thereto, and these wings extend continuously for the full height of the flume gate including its circular base 20. A tubular outlet passage 25 leads rearwardly from the semi-circular face of the flume gate at a level slightly above the base 20 as shown in Fig. 2. Channel irons 26 extend vertically along the opposite edges of the body portion 21 and thus provide guide-ways for transversely disposed spillways 27.

In installing the flume gate, the base 20 is sunk into the dike 11 at the proper height and may be anchored and stabilized by a filling of cement 28. Preferably and as herein shown, the base 20 is perforated to receive pipes or rods 29, disposed in a radial direction and projecting outwardly from the base, and which may be cast into the cement 28. Preferably also the lower spill-board of the series is cast into the cement and thus a secure and water-tight joint is formed at the foot of the spill-board series. The flat face of the flume gate comprised by the spill-boards 27 will ordinarily be aligned with the contour of the reservoir 10, and the discharge passage or duct 25 will lead to the bog 12 which is to be flooded. In practice, the spill-boards 27 will maintain the reservoir 10 at a convenient level. In case of danger from frost, however, the spill-boards may be lifted vertically in their guide-way to permit water from the reservoir to flow out and discharge through the outlet passage 25 until the reservoir is drawn down to the level determined by the remaining spill-boards and the bog covered with water to a sufficient depth. In all cases the spill-boards check any destructive flow of water into the bog and insure gradual flooding without danger of scouring.

Between the bogs 12 and 13 in Fig. 1 is shown a second flume gate similar to that already described except that it is provided with a second or auxiliary pair of wings 31 and 32 disposed transversely and parallel to the wings 23 and 24 but spaced from them so as to constitute an additional obstruction to a burrowing muskrat.

In Fig. 5 is shown a flume gate 33 similar to that already described except that it is provided with two outlet ducts 34 and 35 disposed at substantially 90° to each other. The outlet passage 34 is provided with a series of spill-boards 36 guided in vertical channel irons 37, and the outlet passage 35 is provided with a series of spill-boards 38 guided in vertical channel irons 39. The flume 33, therefore, is adapted to control the water supplied to two separate bogs 40 and 41 and to supply water at a different level to each bog since the discharge is controlled by the two independent series of spill-boards 36 and 38. If desired, the flume gate 33 may be provided with an intermediate drain passage 42 disposed at a level below the outlet passages 34 and 35 and serving to drain the reservoir when the spill-boards 27 are entirely removed.

In Figs. 6 and 7 is shown a modified flume gate 43 in which the base section 44 is extended in full circular cross-section to the top of the flume gate. The body portion is provided with oppositely disposed vertical channel irons 45 which provide guide-ways for a series of spill-boards 46, the lower of which, as before, is set in the concrete filling of the base 44. An inlet duct 47 leads in one direction from the body portion of the flume gate 43 into the reservoir 10, and an outlet passage 48 leads from the opposite face of the flume gate in the direction of the bog. It will be understood that water flows from the reservoir 10 through the passage 47 and then up and over the spill-boards and out through the discharge duct 48. As before, the water level in the reservoir and the amount of water supplied to the bog may be controlled by the number of spill-boards operatively positioned between the channel irons 45.

Having thus disclosed my invention and described in detail certain preferred embodiments thereof, I claim as new and desire to secure by Letters Patent:

1. A flume gate for use in connection with cranberry bogs and the like, comprising a circular, cement-filled base, a semi-cylindrical body portion rising therefrom, cross braces tying together the opposite edges of said body portion, vertical guides disposed adjacent to the opposite edges of said body portion, and an outlet duct leading from the cylindrical wall of said body portion above the level of the base.

2. A flume gate for use in connection with cranberry bogs and the like, comprising a circular base merging into a semi-cylindrical wall rising therefrom, braces tying together the opposite sides of said wall, vertical guides for spill-boards carried by opposite sides of the wall, and an outlet duct leading from said wall near its lower end.

3. A flume gate for use in connection with cranberry bogs and the like, comprising a base section of extended area, a semi-cylindrical wall rising from the base, wings extending externally from opposite sides of said wall, an outlet duct leading from the lower portion of said wall, and vertical guides for a series of spill-boards disposed at the open edges of the said semi-cylindrical wall.

4. A flume gate for use in connection with cranberry bogs and the like, comprising a cylindrical vertically disposed wall defining an inlet opening in one side, a series of spill-boards partially blocking said opening, and outlet ducts leading outwardly in divergent relation from the other side of said wall near its lower end.

5. A flume gate for use in connection with cranberry bogs and the like, comprising a semi-cylindrical vertically disposed wall having an open side extending from top to bottom, parallel guides adjacent to the opposite edges of the open side, spill-boards removably fitted in said guides, outlet ducts leading outwardly from said wall near its lower end, and separate sets of spill-board guides located at the entrance of each outlet duct.

6. A flume gate for use in connection with cranberry bogs and the like, comprising a circular cement-filled base, an upright wall embedded in said base rising therefrom to a substantial height and being at least cylindrical in part, vertical channel irons extending along opposite sides of said wall, the wall defining an inlet opening in one side, an outlet duct leading from said wall near its lower end, and a series of spill-boards removably retained at the ends in said channel irons.

PAUL J. WHIPPLE.

REFERENCES CITED

The following references are of record in the file of this patent:

UNITED STATES PATENTS

| Number | Name | Date |
|---|---|---|
| 952,658 | Worley | Mar. 22, 1910 |
| 1,006,730 | Daugherty | Oct. 24, 1911 |
| 1,284,671 | Hedrick | Nov. 12, 1918 |
| 2,042,350 | McGuire | May 26, 1936 |